(12) United States Patent
Kokko

(10) Patent No.: US 7,736,464 B2
(45) Date of Patent: *Jun. 15, 2010

(54) METHOD OF MAKING ABSORBENT SHEET FROM RECYCLE FURNISH

(75) Inventor: Bruce J. Kokko, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 669 days.

This patent is subject to a terminal disclaimer.

(21) Appl. No.: 11/232,611

(22) Filed: Sep. 22, 2005

(65) Prior Publication Data

US 2006/0060319 A1   Mar. 23, 2006

Related U.S. Application Data

(62) Division of application No. 09/456,270, filed on Dec. 7, 1999, now Pat. No. 6,969,443.

(60) Provisional application No. 60/143,253, filed on Jul. 9, 1999, provisional application No. 60/113,356, filed on Dec. 21, 1998.

(51) Int. Cl.
  *D21H 17/07*   (2006.01)
  *D21H 11/14*   (2006.01)

(52) U.S. Cl. .................. 162/158; 162/185; 162/189

(58) Field of Classification Search ............ 162/158, 162/185, 189
See application file for complete search history.

(56) References Cited

U.S. PATENT DOCUMENTS

| | | | | |
|---|---|---|---|---|
| 3,933,578 A | * | 1/1976 | Kasugai et al. | 162/5 |
| 4,351,699 A | | 9/1982 | Osborn, III | 162/112 |
| 4,441,962 A | | 4/1984 | Osborn, III | 162/111 |
| 4,447,294 A | | 5/1984 | Osborn, III | 162/158 |
| 4,720,383 A | | 1/1988 | Drach et al. | 424/70 |
| 4,795,530 A | | 1/1989 | Soerens et al. | 162/111 |
| 4,913,775 A | * | 4/1990 | Langley et al. | 162/164.3 |
| 5,229,033 A | * | 7/1993 | Nguyen et al. | 516/130 |
| 5,240,562 A | | 8/1993 | Phan et al. | 162/158 |
| 5,279,767 A | | 1/1994 | Phan et al. | 252/357 |
| 5,399,240 A | * | 3/1995 | Graef et al. | 162/9 |
| 5,510,000 A | | 4/1996 | Phan et al. | 162/111 |
| 5,582,681 A | | 12/1996 | Back et al. | 162/5 |
| 5,622,597 A | | 4/1997 | Callen et al. | 162/5 |

(Continued)

FOREIGN PATENT DOCUMENTS

EP    0 718 436 A2    6/1996

(Continued)

OTHER PUBLICATIONS

Smook, "Handbook for Pulp & Paper Technologists", Angus Wilde Publications, 1992, pp. 220-221.*

(Continued)

*Primary Examiner*—Eric Hug
*Assistant Examiner*—Dennis Cordray
(74) *Attorney, Agent, or Firm*—Michael W. Ferrell

(57) ABSTRACT

A process for making absorbent sheet material from recycle furnish includes treatment with a synergistic debonder composition. The debonder is capable of reducing tensile strength by 40 percent or more by way of a quaternary ammonium surfactant component and a nonionic surfactant component.

1 Claim, 4 Drawing Sheets

U.S. PATENT DOCUMENTS

| | | | |
|---|---|---|---|
| 5,632,857 A | 5/1997 | Larson | 162/5 |
| 5,672,248 A | 9/1997 | Wendt et al. | 162/109 |
| 5,695,607 A | 12/1997 | Oriaran et al. | 162/112 |
| 5,698,076 A | 12/1997 | Phan et al. | 162/111 |
| 5,730,839 A * | 3/1998 | Wendt et al. | 162/111 |
| 5,746,887 A | 5/1998 | Wendt et al. | 162/109 |
| 5,753,079 A | 5/1998 | Jenny et al. | 162/158 |
| 5,814,188 A | 9/1998 | Vinson et al. | 162/109 |

FOREIGN PATENT DOCUMENTS

| | | |
|---|---|---|
| EP | 0851062 A2 | 7/1998 |
| EP | 0 896 046 A1 | 2/1999 |
| WO | WO98/23813 | 6/1998 |

OTHER PUBLICATIONS

Ciba Specialty Chemicals Technical Data Sheet for SAPAMIN® P.

Notice of Opposition, Nov. 15, 2006.

Response to Notice of Opposition, Jun. 14, 2007.

* cited by examiner

ID OF MAKING ABSORBENT SHEET FROM RECYCLE FURNISH

CLAIM PRIORITY

This application is a divisional patent application of U.S. Ser. No. 09/456,270, filed Dec. 7, 1999 now U.S. Pat. No. 6,969,443, which is a non-provisional application which claims the benefit of U.S. Provisional Application Ser. No. 60/113,356, filed Dec. 21, 1998 and U.S. Provisional Patent Application Ser. No. 60/143,253, filed Jul. 9, 1999, of the same title. The priorities of the foregoing applications are hereby claimed.

TECHNICAL FIELD

The present invention relates generally to a method of making an absorbent sheet from recycled fiber, and more particularly in preferred embodiments to improvements to such processes incorporating a debonder composition including both a quaternary ammonium salt and a nonionic surfactant.

BACKGROUND

Debonder compositions and surfactants are widely used in the paper industry. For example, such compositions are used in connection with recycle fiber. There is disclosed in U.S. Pat. No. 5,582,681 to Back et al. a method of making a sanitary paper product from newspaper involving pulping the newspaper in water with agitation to produce a pulp slurry at a consistency between 3 and 12% and a pH below about 8.0; adding to the slurry an enzyme selected from the group consisting of cellulase, hemicellulase, and lipase and maintaining the pulp slurry at a temperature above about 100° F. for at least 15 minutes; and using the enzyme treated pulp as a major source of fiber in the paper making to produce the sanitary napkin product. As reported in the '681 patent, there is a synergistic relationship between the combination of surfactant and an enzyme. Nonionic surfactants are preferred for addition with the enzyme; however, in some cases a cationic surfactant can be used, such as an imidazole compound or quaternary ammonium compounds. See column 10, lines 7-40.

There is disclosed in U.S. Pat. No. 5,622,597 to Callen et al. a process for deinking recycled paper using a pressurized deinking module to separate ink from paper pulp stock. The addition of salts of imidazolinium based compounds with alkyl, alkenyl and amidoethyl side chains to the pulp slurry at the beginning of the pressurized deinking module cycle removes ink more effectively. Surfactants are used in the deinking process, for example, an ethylene oxide/propylene oxide nonionic surfactant (compare Example A), as well as imidazolinium methylsulfate (Example 1), see column 4.

Debonder compositions are often added at the wet end of a process for making tissue paper as disclosed in U.S. Pat. No. 4,441,962 to Osborn, III and U.S. Pat. No. 4,351,699 also to Osborn, III. There is disclosed in these patents a method of making tissue paper webs including the steps of forming an aqueous paper making furnish from paper pulp, and adding at least one specified quaternary ammonium compound and at least one specified nonionic surfactant. The quaternary ammonium compounds are trimethylalkylenyl, methylpolyoxy-ethylene alkyl and methylpolyoxyethylene alkylenyl quaternary ammonium compounds. The nonionic surfactants are ethylene oxide adducts of fatty alcohols and fatty acids.

There is disclosed in U.S. Pat. No. 5,698,076 to Phan et al. a method of making absorbent paper products such as paper towels, facial tissues and toilet tissue by way of the incorporation of a vegetable oil based quaternary ammonium chemical softening compound. Examples of preferred vegetable oil based quaternary ammonium chemical softening compounds according to the '076 patent, include diester di(oleyl)dimethyl ammonium chloride (DEDODMAC) derived from canola oil and/or high oleic safflower oil. It is noted in the '076 patent that complex quaternary ammonium compounds are sometimes used with nonionic surfactants such as ethylene oxide and propylene oxide reacted with an alcohol in order to overcome any decrease in absorbency caused by the use of cationic debonding compounds. See Column 2, lines 6 through line 18. It is noted in the '076 patent that the claimed process may be used in connection with recycled fiber (column 4, lines 54-55) and that optional ingredients such as polyhydroxy compounds and nonionic surfactants (alkoxylated materials) may be added so long as softening is not adversely affected (See column 11, line 23 and following, as well as column 13 line 6 and following. The nonionic surfactants of the '076 patent are characterized by a hydrophilic-lipophilic balance ("HLB") of from about 7 to about 20. See column 11, lines 53-63.

U.S. Pat. No. 5,730,839 to Wendt et al. discloses a method of making tissue products through creping under closed pocket conditions. In connection with this process, debonders/softening agents are used which include several imidazolinium quaternary compounds. The imidazolinium quaternary compounds can be added to the tissue making process at any point prior to the creping blade but are preferably added at the wet end and most preferably added to the thick stock prior to the web formation where the consistency of the aqueous paper making fiber suspension is about 2% or greater. In addition to the imidazolinium quaternary compounds, nonionic surfactants may also be added to the tissue at the wet end of tissue making process to further enhance the softness of the final product. Examples of useful classes of nonionic surfactants include alkylphenol ethoxylates, aliphatic alcohol ethoxylates, fatty acid alkoxylates, fatty alcohol alkoxylates, block copolymers of ethylene oxide and propylene oxide, condensation products of ethylene oxide with the product resulting from the reaction of propylene oxide and ethylenediamine and condensation products of propylene oxide with the product of the reaction of ethylene oxide and ethylenediamine. See column 3, lines 11 through 46.

U.S. Pat. No. 5,753,079 to Jenny et al. reports enhanced paper debonding and softening by producing paper from an aqueous suspension of fibers which contains one or more cationic agents and one or more ethylene oxide/propylene polymer surfactants.

U.S. Pat. No. 4,447,294 to Osborn, III discloses a process for making soft absorbent tissue paper webs and the webs produced by the process. In the first step the furnish of paper-making fibers and a wet strength resin is provided. A web fibrous web is made from the furnish and the wet web is dried after which the wet strength resin in the web is at least partially cured and the nitrogenous cationic debonding agent is then incorporated into the dried web.

U.S. Pat. No. 5,279,767 to Phan et al. discloses a chemical softening composition useful in fibrous cellulosic materials. There is provided in accordance with the '767 patent, chemical softening compositions including a mixture of quaternary ammonium compound and polyhydroxy compounds. Preferred quaternary ammonium compounds include dialkyldimethylammonium salts such as di(hydrogenated) tallow dimethylammonium chloride and di(hydrogenated) tallow dimethylammonium methylsulfate. Preferred polyhydroxy compounds are selected from the group consisting of glycerol and polyethylene glycols and polypropylene glycols having a weight average of a molecular weight from about 200 to 4000. The chemical softening compositions are prepared by first mixing the polyhydroxy compound into the quaternary ammonium compound at a specific temperature range wherein the polyhydroxy compound is miscible with the quaternary ammonium compound and then diluting the mixture at an elevated temperature to form an aqueous vesicle dispersion suitable for treating fibrous cellulosic material. The chemical softening compositions disclosed in the '767 patent are primarily intended for softening disposable paper products such as tissues and towels. See, for example, U.S. Pat. No. 5,240,562 of Phan et al.

SUMMARY OF INVENTION

It has been found in accordance with the present invention that certain combinations of nonionic surfactants and quaternary ammonium surfactants exhibit synergy when used as debonders, particularly in connection with products made from recycle furnish. There is provided in a first aspect of the invention an improved process for making an absorbent sheet material from a web of fibrous material consisting predominately of cellulosic recycle fiber which includes treating the fibrous material with a debonding composition which contains a synergistic combination of: (a) a quaternary ammonium surfactant component; and (b) a nonionic surfactant component wherein the debonding composition is operable to reduce the tensile strength of the sheet by at least about 25 percent by application to the fibrous material at a treatment level of 1 mole of said quaternary ammonium surfactant component per ton of fibrous material. More particularly, the debonding composition is operable to reduce the tensile strength of said sheet by at least about 40 percent by application to the fibrous material at a treatment level of 3 moles of the quaternary ammonium surfactant component per ton of fibrous material.

Generally, treatment involves application of from about 1 to about 16 pounds of the debonding composition per ton of absorbent sheet material produced. More typically, within the range of from about 3 to about 8 pounds of the debonding composition are employed per ton of absorbent sheet material, with from about 4 to about 6 pounds of the debonding composition perhaps being most typical and preferred.

The nonionic surfactant component is generally present in said debonding composition in an amount of from about 25 to about 60 weight percent based on the combined weights of the nonionic surfactant component and the quaternary ammonium surfactant component, with from about 30 to about 50 weight percent based on the combined weights of the nonionic surfactant component and the quaternary ammonium surfactant component being more typical.

The recycle fiber may have an ash content greater than about 0.75 percent by weight; greater than about 1 percent by weight; greater than about 2 percent by weight; or greater than 4 percent by weight.

The quaternary ammonium surfactant component most preferably includes an imidazolinium salt; whereas the nonionic surfactant component preferably includes a surfactant selected from the group consisting of alkoxylated fatty acids and alkoxylated fatty alcohols. Most typically, the nonionic surfactant component is an ethoxylated fatty acid, such as a polyethylene glycol ester of a fatty acid and the quaternary ammonium surfactant component includes an imidazolinium salt.

In another aspect of the present invention, there is provided a process for making an absorbent sheet material from a web of fibrous material consisting predominately of cellulosic recycle material which involves treating the fibrous material with a debonding composition which includes a synergistic combination of: (a) a quaternary ammonium surfactant component; and (b) a nonionic surfactant component wherein the debonding composition is operable to reduce the tensile strength of said sheet by at least about 40 percent. The fibrous material is generally or predominately at least about 50 percent by weight cellulosic recycle fiber. Typically, the fibrous material is at least about 75 percent by weight of cellulosic recycle material and, preferably, the fibrous material is 100 percent by weight of cellulosic recycle material.

In yet another aspect of the present invention, there is provided a method of forming an absorbent paper product by way of: (a) preparing a recycle furnish comprising predominantly recycle fibers in an aqueous stream; (b) adding a debonder composition to the furnish, the debonding composition including a quaternary ammonium and surfactant component and a nonionic surfactant component; (c) supplying the aqueous stream to a headbox; (d) applying the furnish to a forming wire and forming a nascent web; and, (e) drying the web to form the absorbent paper product, wherein the debonding composition is operable to reduce the tensile strength of the absorbent paper product by at least about 25 percent by employing the debonder composition at a level of 1 mole of the quaternary ammonium surfactant component per ton of the absorbent paper product. The nonionic surfactant component may be a polyalkoxy ester, such as a polyethylene glycol ester of a fatty acid selected from the group consisting of: lauric acid, palmitic acid, oleic acid, stearic acid, myristic acid, arachidic acid, lignoceric acid, palmitoleic acid, linoleic acid, arachidonic acid and mixtures thereof. Most preferably, the fatty acid employed is lauric acid.

The quaternary ammonium component may include a quaternary ammonium species selected from the group consisting of: an alkyl(enyl)amidoethyl-alkyl(enyl)-imidazolinium, dialkyldimethylammonium, or bis-alkylamidoethyl-methyl-hydroxyethyl-ammonium salt; wherein the alkyl groups are saturated, unsaturated, or mixtures thereof, and the hydrocarbon chains have lengths of from ten to twenty-two carbon atoms.

In some applications, the inventive process includes the step of creping the absorbent paper product.

In still another aspect of the present invention, there is provided in a process for making an absorbent sheet material from a web of fibrous material consisting predominately of cellulosic recycle fiber, the improvement which involves treating the fibrous material with a debonding composition which includes a synergistic combination of: (a) a quaternary ammonium surfactant component comprising a surfactant compound selected from the group consisting of a dialkyldimethyl-ammonium salts of the formula:

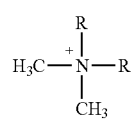

a bis-dialkylamidoammonium salt of the formula:

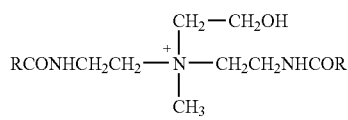

a dialkylmethylimidazolinium salt of the formula:

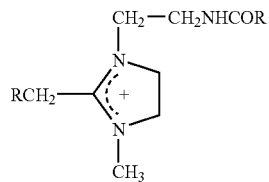

wherein each R may be the same or different and each R indicates a hydrocarbon chain having a chain length of from about twelve to about twenty-two carbon atoms and may be saturated or unsaturated; and wherein said compounds are associated with a suitable anion; and (b) a nonionic surfactant component. Preferably, the ammonium salt is a dialkyl-imidazolinium compound and the suitable anion is methylsulfate. The nonionic surfactant component typically includes the reaction product of a fatty acid or fatty alcohol with ethylene oxide such as a polyethylene glycol diester of a fatty acid (PEG diols or PEG diesters).

In still yet another aspect of the present invention, there is provided a method for forming a soft absorbent tissue product including: supplying a furnish comprising predominately recycle cellulosic fibers in an aqueous stream; adding a charge modifier to the furnish wherein the charge modifier contacts the furnish for a time sufficient to reduce the charge in the furnish; adding a debonder composition comprising a synergistic combination of a quaternary ammonium surfactant component and nonionic surfactant component and optionally adding a wet-strength-adjusting agent to said furnish, after the charge has been reduced; adding a retention aid to the furnish after the debonder or wet strength adjusting agent has been in contact with the furnish for a time sufficient to allow distribution of the debonder or wet strength adjusting agent on the fibers; supplying the furnish to a headbox, and wherein the furnish has a consistency of not greater than 0.90% as supplied to the headbox; applying the furnish to a forming wire and forming a nascent web; and drying the web to form a paper product. Typically, the drying step includes: compactively dewatering the nascent web; applying the web to a Yankee dryer and drying said web; and creping the web from the Yankee dryer at a moisture content of less than about 50%. The moisture content during creping is usually less than about 15% and preferably less than about 6%. The consistency of the furnish as supplied to the headbox is generally less than about 0.7% and preferably less than about 0.5%. The furnish generally contains greater than about 1% ash, and typically the furnish contains greater than about 2% ash and sometimes more than about 4% ash. Most preferably the furnish contains only recycled fibers and the charge modifier is added in an amount of from about 1 lb/ton to about 10 lbs/ton. The charge modifier is usually added in an amount of from about 2 lbs/ton to about 6 lbs/ton.

Most typically, a wet-strength-adjusting agent is added in an amount of from about 4 lbs/ton to about 30 lbs/ton. The drying step may include through-air drying.

The process of the invention may be advantageously practiced wherein the tissue product is a single-ply tissue product.

BRIEF DESCRIPTION OF THE DRAWINGS

The invention is described below in connection with the various figures in which.

DETAILED DESCRIPTION

The present invention is a paper product made, preferably, using conventional wet pressing, from a recycle fiber furnish having significant amounts of ash and fines. The resulting product has good internal void volume, good strength and softness.

Paper products according to the present invention may be manufactured on any papermaking machine of conventional forming configurations such as Fourdrinier, twin-wire, suction breast roll or crescent forming configurations. The forming mode is advantageously water or foam. The drying method is advantageously conventional wet pressing but can be any known drying from including, for example, through air-drying (TAD), can drying or impulse drying.

Figure 1:
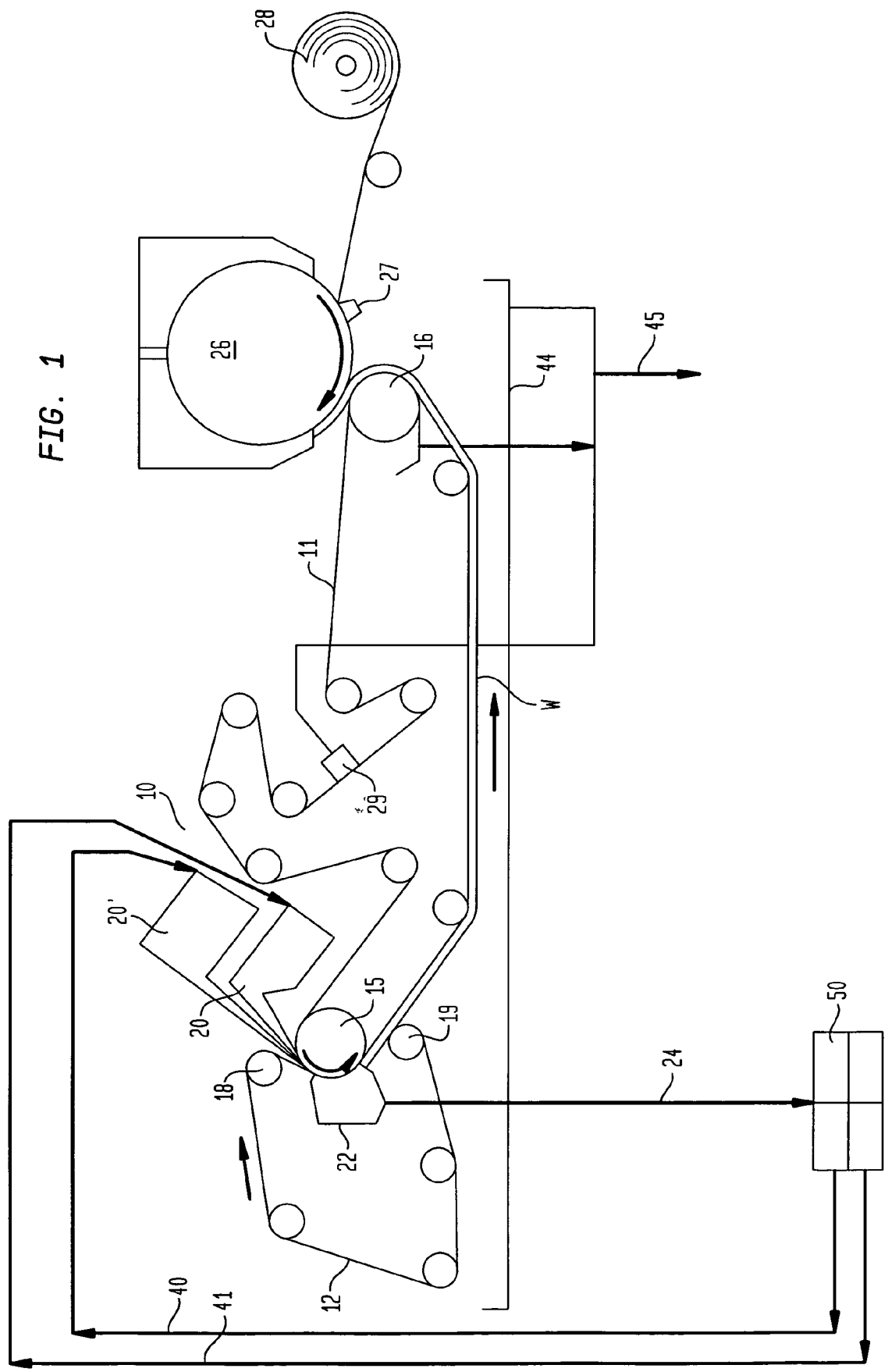
FIG. 1 is a schematic diagram illustrating a papermaking process in accordance with the present invention.

FIG. 1 illustrates one embodiment of the present invention where a machine chest 50, which may be compartmentalized, is used for preparing furnishes that are treated with chemicals having different functionality depending on the character of the various fibers used. This embodiment shows a divided headbox thereby making it possible to produce a stratified product. The product according to the present invention can be made with single or multiple headboxes and regardless of the number of headboxes may be stratified or unstratified. The treated furnish is transported through different conduits 40 and 41, where it is delivered to the headbox of a crescent forming machine 10 as is well known, although any convenient configuration can be used.

FIG. 1 shows a web-forming end or wet end with a liquid permeable foraminous support member 11 which may be of any convenient configuration. Foraminous support member 11 may be constructed of any of several known materials including photopolymer fabric, felt, fabric or a synthetic filament woven mesh base with a very fine synthetic fiber batt attached to the mesh base. The foraminous support member 11 is supported in a conventional manner on rolls, including breast roll 15, and pressing roll, 16.

Forming fabric 12 is supported on rolls 18 and 19 which are positioned relative to the breast roll 15 for guiding the forming wire 12 to converge on the foraminous support member 11 at the cylindrical breast roll 15 at an acute angle relative to the foraminous support member 11. The foraminous support member 11 and the wire 12 move at the same speed and in the same direction which is the direction of rotation of the breast roll 15. The forming wire 12 and the foraminous support member 11 converge at an upper surface of the forming roll 15 to form a wedge-shaped space or nip into which one or more jets of water or foamed liquid fiber dispersion may be injected and trapped between the forming wire 12 and the foraminous support member 11 to force fluid through the wire 12 into a save-all 22 where it is collected to reuse in the process.

The nascent web W formed in the process is carried by the foraminous support member 11 to the pressing roll 16 where the wet nascent web W is transferred to the Yankee dryer 26. Fluid is pressed from the wet web W by pressing roll 16 as the web is transferred to the Yankee dryer 26 where it is dried and creped by means of a creping blade 27. The finished web is collected on a take-up roll 28.

A pit 44 is provided for collecting water squeezed from the furnish by the press roll 16, as well as collecting the water removed from the fabric by a Uhle box 29. The water collected in pit 44 may be collected into a flow line 45 for separate processing to remove surfactant and fibers from the water and to permit recycling of the water back to the papermaking machine 10.

The web according to the present invention can be made using fibers well known to the skilled artisan. Preferred fibers are cellulose based recycle fiber and may include softwood, hardwood, chemical pulp obtained from softwood and/or hardwood by treatment with sulfate or sulfite moieties, mechanical pulp obtained by mechanical treatment of softwood and/or hardwood, recycle fiber, refined fiber and the like. Preferably, the fibers are predominately or more than 50 percent by weight recycle cellulosic fiber.

Papermaking fibers used to form the soft absorbent products of the present invention may include cellulosic fibers commonly referred to as wood pulp fibers, liberated in the pulping process from softwood (gymnosperms or coniferous trees) and hardwoods (angiosperms or deciduous trees). The particular tree and pulping process used to liberate the tracheid are not critical to the success of the present invention. Cellulosic fibers from diverse material origins may be used to form the web of the present invention, including non-woody fibers liberated from sabai grass, rice straw, banana leaves, paper mulberry (i.e. bast fiber), abaca leaves, pineapple leaves, esparto grass leaves, and fibers from the genus *hesperalae* in the family agavaceae. The recycled fibers used in accordance with the present invention may contain any of the above fiber sources in different percentages can be used in the present invention.

Papermaking fibers can be liberated from their source material by any one of the number of chemical pulping processes familiar to the skilled artisan including sulfate, sulfite, polysulfide, soda pulping, etc. The pulp can be bleached if desired by chemical means including the use of chlorine, chlorine dioxide, oxygen, etc. Furthermore, papermaking fibers can be liberated from source material by any one of a number of mechanical/chemical pulping processes familiar to anyone experienced in the art including mechanical pulping, thermomechanical pulping, and chemithermomechanical pulping. The mechanical pulps can be bleached, if one wishes, by a number of familiar bleaching schemes including alkaline peroxide and ozone bleaching.

Fibers for use according to the present invention are preferably obtained primarily from recycling of pre- and post-consumer paper products. Fiber may be obtained, for example, from the recycling of printers' trims and cuttings, including book and clay coated paper, post consumer paper including office and curbside paper recycling and old newspaper.

The various collected papers can be recycled using means common to recycled paper industry. The papers may be sorted and graded prior to pulping in conventional low-, mid-, and high-consistency pulpers. In the pulpers the papers are mixed with water and agitated to break the fibers free from the sheet. Chemicals common to the industry may be added in this process to improve the dispersion of the fibers in the slurry and to improve the reduction of contaminants that may be present. Following pulping, the slurry is usually passed through various sizes and types of screens and cleaners to remove the larger solid contaminants while retaining the fibers. It is during this process that such waste contaminants as paper clips and plastic residuals are removed.

The pulp is then generally washed to remove smaller sized contaminants consisting primarily of inks, dyes, fines and ash. This process is generally referred to as deinking. Deinking, in the modern sense, refers to the process of making useful pulp from wastepaper while removing an ever increasing variety of objectionable, noncellulosic materials.

One example of a deinking process by which fiber for use in the present invention can be obtained is called floatation. In this process small air bubbles are introduced into a column of the furnish. As the bubbles rise they tend to attract small particles of dye and ash. Once upon the surface of the column of stock they are skimmed off. At this point the pulp may be relatively clean but is often low in brightness. Paper made from this stock can have a dingy, gray appearance, not suitable for near-premium product forms.

To increase the brightness the furnish is often bleached. Bleaching can be accomplished by a number of means including, but not limited to, bleaching with chlorine, hypochlorite, chlorine dioxide, oxygen, peroxide, hydrosulfite, or any other commonly used bleaching agents. The types and amounts of bleaching agents depend a great deal on the nature of the wastepaper being processed and upon the level of desired brightness. Generally speaking, unbleached waste papers can have brightness levels between 60 to 80 on the G.E. brightness scale, depending upon the quality of the paper begin recycled. Bleached waste papers can range between the same levels and may extend up to about 90, however, this brightness level is highly dependent upon the nature of the waste papers used.

Since the cost of waste paper delivered to the pulp processing plant is related to the cleanliness and quality of the fibers in the paper, it is advantageous to be able to upgrade relatively low cost waste papers into relatively high value pulp. However, the process to do this can be expensive not only in terms of machinery and chemical costs but also in lost yield. Yield is defined as the percentage by weight of the waste paper purchased that finally ends up as pulp produced. Since the lower cost waste papers generally contain more contaminants, especially relatively heavy clays and fillers generally associated with coated and writing papers, removal of these contaminants can have a dramatic effect on the overall yield of pulp obtainable. Low yields also translate into increased amounts of material that must be disposed of in landfills or by other means.

In addition, as the ash levels are reduced, fines and small fibers are also lost since there is currently no ash-specific removal process in use which removes only ash without taking small fibers and fines. For example, if a pulp of 70 percent yield can be used rather than a "cleaner" 50 percent yield the savings in pulp cost due to more fiber and less waste removal is significant.

Generally, premium grade products are not made using a major amount of secondary recycle fibers, let alone being made predominately or entirely from secondary recycle fibers. Recycled fibers suffer from problems with low brightness requiring the addition of virgin fibers; and, slow furnish dewatering resulting in poor drainage on the forming wire and necessitating slower machine speeds. Base sheets made with a high percentage or 100% recycled fibers are very dense. Therefore, their strength does not break down as much during creping. This results in harsh, high strength, creped paper. Prior to the present invention, it has been understood that to include recycle fibers, it is necessary to preprocess the fibers to render them substantially free from ash. This inevitably increases cost. Failing to remove the ash is believed to create often insurmountable problems with drainage or formation. If sufficient water is added to the stock to achieve good web formation, the forming wires often flood. If the water is reduced to prevent this flooding problem, there are often severe problems in forming a substantially homogeneous web. The present invention addresses these difficulties encountered when using high ash content fibers, e.g., secondary recycled fibers.

The product according to the present invention is made from a furnish that contains both ash and fines and/or fillers. Fillers according to the present invention include art recognized fillers that are generally used to reduce fiber content in the production of bulky absorbent paper products. Typical fillers include structured kaolins, however, selection of appropriate fillers will be within the ordinary skill of the artisan.

The preferred furnishes according to the present invention contain significant amounts of secondary fibers that possess significant amounts of ash and fines. It is common in the industry to hear the term ash associated with virgin fibers. This is defined as the amount of ash that would be created if the fibers were burned. Typically no more than about 0.1% to about 0.2% ash is found in virgin fibers. Ash as used in the present invention includes this "ash" associated with virgin fibers as well as contaminants resulting from prior use of the fiber.

Furnishes according to the invention include excess of amounts of ash greater than about 1% or more as noted above. Ash originates when fillers or coatings are added to paper during formation of a filled or coated paper product. Ash will typically be a mixture containing titanium dioxide, kaolin clay, calcium carbonate and/or silica. This excess ash or particulate matter is what has traditionally interfered with processes using recycle fibers, thus making the use of recycled fibers unattractive. In general recycled paper containing high amounts of ash is priced substantially lower than recycled papers with low or insignificant ash contents. Thus, there will be a significant advantage to a process for making a premium or near-premium product from recycled paper containing excess amounts of ash.

Furnishes containing excess ash also typically contain significant amount of fines. Ash and fines are most often associated with secondary, recycled fibers, post-consumer paper and converting broke from printing plants and the like. Secondary, recycled fibers with excess amounts of ash and significant fines are available on the market and are quite cheap because it is generally accepted that only very thin, rough, economy towel and tissue products can be made unless the furnish is processed to remove the ash. The present invention makes it possible to achieve a paper product with high void volume and premium or near-premium qualities from secondary fibers having significant amounts of ash and fines without any need to preprocess the fiber to remove fines and ash. While the present invention contemplates the use of fiber mixtures, including the use of virgin fibers, most fiber in the products according to the present invention will have greater than 0.75% ash, more preferably greater than 1% ash. Still more preferably, the fiber will have greater than 2% ash and may have as high as 30% ash or more.

As used in the present invention, fines constitute material within the furnish that will pass through a 100 mesh screen. Ash and ash content is defined as above and can be determined using TAPPI Standard Method T211 om-93.

In a most preferred embodiment of the present invention, a premium or near-premium-quality product is produced using a mixture of secondary fibers from a blend of recycled papers, including for example, printers' trim and cuttings and post consumer paper.

The dispersion of the fibers to form a furnish is accomplished by the addition of water and includes the use of chemical additives to alter the physical properties of the paper produced. Typically, the initial additive included in the furnish according to the present invention is a charge modifier. Since the fines and ash components (e.g. clays, calcium carbonate, titanium dioxide, etc.) are anionic, charge neutralization is advantageously accomplished by addition of cationic materials to the overall system. A charge modifier according to the present invention is a material that when added to the fiber furnish serves to reduce the charge on the fine fraction of the furnish (passing through-80-mesh) by about 30% to about 98%. The charge modifier preferably reduces the charge on the through-80-mesh fraction of the furnish to between about 30% and about 95% of its original value, more preferably to between about 50% and about 80% of its original value. In a most preferred embodiment, the charge modifier reduces the charge on the through-80-mesh fraction of the furnish by about 70%.

A charge modifier is preferably added in an amount of from about 1 to about 10 lbs/ton, more preferably from about 1 to about 8 lbs/ton, and most preferably from about 2 to about 6 lbs/ton.

The charge-modifying agent should contact the furnish for a time sufficient to neutralize substantially all of the anionic charge on the ash and fines. The charge modifier preferably contacts the furnish for from about 10 seconds to about 45 minutes before any debonder and/or softener is added to the furnish, more preferably from about 20 seconds to about 30 minutes, most preferably from about 1 minute to 15 minutes.

Appropriate charge-modifying agents can be selected from linear or branched synthetic polymers having molecular weights of less than about 1 million. For branched polymers, the molecular weights are preferably below about 750,000. The more preferred charge-modifying agents are relatively low-molecular-weight cationic linear synthetic polymers preferably having molecular weights of no more than about 500,000 and more preferably not more than about 300,000. The charge densities of such low-molecular-weight cationic synthetic polymers are relatively high. These charge densities range from about 4 to about 12 equivalents of cationic nitrogen per kilogram of polymer. Suitable charge-modifying agents include inorganic salts such as alum or aluminum chloride and their polymerization products (e.g. PAC or polyaluminum chloride or synthetic polymers); poly(diallyldimethyl ammonium chloride) (i.e., DADMAC); poly(dimethylamine)-co-epichlorohydrin; polyethyleneimine; poly(3-butenyltrimethyl ammonium chloride); poly(4-ethenylbenzyltrimethylammonium chloride); poly(2,3- epoxypropyltrimethylammonium chloride); poly(5-isoprenyltrimethylammonium chloride); and poly(acryloyloxyethyltrimethyl-ammonium chloride). Other suitable cationic compounds, such as, for example, the polymer made from the adduct of 2-chloromethyl; 1,3-butadiene and a dialkylsulfide, all polyamines made by the reaction of amines such as, for example, ethylenediamine, diethylenetriamine, triethylenetetramine or various dialkylamines, with bishalo, bis-epoxy, or chlorohydrin compounds such as, for example, 1-2 dichloromethane, 1,5-diepoxyhexane, or epichlorohydrin; all polymer of guanidine such as, for example, the product of guanidine and formaldehyde with or without polyamines may be employed if so desired.

Commercially available suitable charge-modifying agents include Cypro®514, a product of Cytec, Inc. of Stamford, Conn.; Bufloc® 5031 and Bufloc® 534, both products of Buckman Laboratories, Inc. of Memphis, Tenn. The charge-modifying agent is preferably selected from low-molecular-weight, high charge density polymers.

Preferred charge-modifiers are polydiallyldimethylammonium chloride (DADMAC) having molecular weights of about 90,000 to about 300,000, polyamines having molecular weights of about 50,000 to about 300,000 and polyethyleneimine having molecular weights of about 40,000 to about 750,000.

After the charge-modifying agent has been in contact with the furnish for a time sufficient to reduce the charge on the furnish, a debonder is added. In accordance with the invention the debonder includes an ammonium surfactant component and a nonionic surfactant component as noted above.

Whether or not a molecule acts as a debonder or softener depends largely on where it is added in the process. In general, wet end addition brings about both debonding and softening, whereas spray application favors softening but still may operate as a debonder to some extent. In general, any surface-active molecule will debond paper if it can get into and stays within the fibers and the inter-fiber bonding region. The longer the chain length on the hydrophobic chains on the molecule, the better; with two chains per molecule being best. An exception is where the carbon chain length exceeds 20; then, usually, a single chain per molecule is better.

When the debonder is added a softener may also be added. While the chemicals that constitute softeners and debonders may overlap, for the purposes of the present invention, a debonder is added to reduce the inter-fiber bonding in the paper web. A softener is added to change the surface characteristics of the fibers to thereby change the tactile impression given when the paper web is touched.

A non-exhaustive list of cationic materials useful as wet-strength adjusting agents includes polyamide epihalohydrin (for example, resins marketed by Georgia Pacific Resins, Inc. under the tradename AMRES or by Borden under the tradename CASCAMID), glyoxylated cationic polyacrylamides (for example, resins marketed by Cytec Industries, Inc. under the tradename PAREZ), polyacrylamide, polyethylenimine, polyDADMAC, alkaline-curing wet strength resins, urea formaldehyde, acid-curing wet strength resins and melamine-formaldehyde, acid-curing wet strength resins. A reasonably comprehensive list of cationic wet strength resins that may be used is described by Westfelt in *Cellulose Chemistry and Technology*, Volume 12, p. 813, 1979, which is incorporated herein by reference.

Thermosetting cationic polyamide resins, also useful in the present invention as wet-strength-adjusting agents, are reaction products of an epihalohydrin and a water soluble polyamide having secondary anionic groups derived from polyalkylene polyamine and saturated aliphatic dibasic carboxylic acids containing from 3 to 10 carbon atoms. These materials are relatively low-molecular-weight polymers having reactive functional groups such as amino, epoxy, and azetidinium groups. Description of processes for making and using such materials are included in U.S. Pat. Nos. 3,700,623 and 3,772,076, both to Keim and incorporated herein by reference in their entirety. A more extensive description of polymeric-epihalohydrin resins is given in Chapter 2: Alkaline-Curing Polymeric Amine-Epichlorohydrin by Espy in Wet-Strength Resins and Their Applications (L. Chan, Editor, 1994), herein incorporated by reference in its entirety. The resins described in this article fall within the scope and spirit of the present invention. Polyamide-epichlorohydrin resins are commercially available under the tradename Kymene® from Hercules Incorporated and CASCAMID® from Borden Chemical Inc.

Thermosetting polyacrylamides, also appropriate for use as wet-strength-adjusting agents, are produced by reacting acrylamide with diallyl dimethyl ammonium chloride (DADMAC) to produce a cationic polyacrylamide copolymer which is ultimately reacted with glyoxal to produce a cationic cross-linking wet strength resin, glyoxylated polyacrylamide. These materials are generally described in U.S. Pat. No. 3,556,932 to Coscia et al. and U.S. Pat. No. 3,556,933 to Williams et al., both of which are incorporated herein by reference to their entirety. Resins of this type are commercially available under the tradename of PAREZ by Cytec Industries. Different mole rations of acrylamide/DADMAC/glyoxal can be used to produce cross-linking resins which are useful in the present invention. Furthermore, other dialdehydes can be substituted for glyoxal. Wet-strength-adjusting agents are preferably added in an amount of from about 4 to about 30 lbs/ton, more preferably from about 4 to about 25 lbs/ton, most preferably from about 6 to about 14 lbs/ton.

In the production of towels and napkins the efficiency of the wet-strength-adjusting agent is increased through the combined use of a charge modifier and retention aid.

Auxiliary agents that can be added to improve wet strength properties in towels and napkins according to the present invention include carboxymethyl cellulose or an anionic copolymer of acrylamide-acrylate, for example, ACCOSTRENGTH 85 from Cytec Industries, Inc. or AMBOND 1500 from Georgia-Pacific Resins, Inc. The manipulation of the relative amounts of wet-strength-adjusting agents and auxiliary agents is well understood by the skilled artisan. Auxiliary agents are preferably added in an amount of from about 0 to about 10 lbs/ton, more preferably from about 1 to about 8 lbs/ton, most preferably from about 2 to about 5 lbs/ton.

A retention aid is also added to the furnish to form the product according to the present invention. Retention aids refer to an additive used to increase the retention of the ash and fines within the web during the papermaking process. Retention aids are discussed, for example, in J. E. Unbehend and K. W. Britt, "*Pulp and Paper, Chemistry and Chemical Technology*," Chapter 17, Retention Chemistry, Ed. 3, Vol. 3, Wiley Interscience publications and Chapter 18 of the *Kirk Othmer "Encyclopedia of Chemical Technology*, $4^{th}$ ed." both of which are incorporated herein by reference in their entirety. Suitable retention aids will be readily apparent to the skilled artisan.

Retention systems suitable for the manufacture of tissue of this invention involve bridging or networking of particles through oppositely charged high molecular weight macromolecules. Alternatively, the bridging is accomplished by employing dual polymer systems. Macromolecules useful for the single additive approach are cationic polyacrylamide such as, for example, poly(acrylamide)-co-diallyldimethyl ammonium chloride; poly(acrylamide)-co-acryloyloxyethyl trimethylammonium chloride, cationic gums, chitosan, cationic polyacrylates, and cationic starches (both amylase and amylopectin). Natural macromolecules such as, for example, starches and gums, are rendered cationic usually be treating them with 2,3-epoxypropyltrimethylammonium chloride, but other compounds can be used such as, for example, 2-chloroethyl-dialkylamine, acryloyloxyethyldialkyl ammonium chloride, acrylamidoethyltrialkylammonium chloride, etc. Dual additive useful for the dual polymer approach are any of these compounds which function as coagulants plus a high molecular weight anionic macromolecule such as, for example anionic starches, CMC(Carboxymethylcellulose), anionic gums, anionic polyacrylamides (e.g., poly(acrylamide)-co-acrylic acid), or a finely dispersed colloidal particle (e.g., colloidal silica, colloidal alumina, bentonite clay, or polymer micro particles marketed by Cytec Industries, Inc. under the tradename POLYFLEX).

Suitable cationic monomers for use as retention aids according to the present invention include dialkyl amino alkyl-(meth)acrylates or -meth)acrylamides, either as acid salts or quaternary ammonium salts. Suitable alkyl groups include dialkylaminoethyl(meth)acrylates, dialkylaminoethyl(meth)acrylamides and dialkylaminomethyl(meth)acrylamides and dialkylamino-1,3-propyl(meth)acrylamides. These cationic monomers may be copolymerized with a nonionic monomer, preferably acrylamide. Other suitable polymers are polyethylene imines, polyamide epichlorohydrin polymers, and homopolymers or copolymers, generally with acrylamide, of monomers such as diallyl dimethyl ammonium chloride. The retention aid is preferably a substantially linear polymer when compared with the globular structure of, for example, starch.

Natural macromolecules such as, for example, cellulose, starch and gums are typically rendered anionic by treating them with chloroacetic acid, but other methods such as phosphorylation can be employed. Suitable retention agents are nitrogen containing organic polymers having molecular weights of about one hundred thousand to about thirty million. Suitable high molecular weight polymers are polyacrylamides, anionic acrylamide-acrylate polymers, cationic acrylamide copolymers having molecular weights of about one million to about thirty million and polyethyleneimines having molecular weights in the range of about five hundred thousand to about two million.

Another mechanism by which the fines/ash are retained in the paper product according to the present invention is entrapment. This is the mechanical entrapment of particles in the fiber network. Entrapment is suitably achieved by maximizing network formation such as by forming the networks in the presence of high molecular weight anionic polyacrylamides, or high molecular weight polyethyleneoxides (PEO), such as, Polyox WSR 301 from Union Carbide. Alternatively, molecular nets are formed in the network by the reaction of dual additives such as, for example, PEO and phenolic resin.

Useful charge densities include those between about 0.2 and about 15 equivalents per kilogram of polymer, more preferably between about 0.2 and about 10, most preferably between about 0.5 and about 5 equivalents per kilogram of polymer.

Preferred polymers according to the present invention have molecular weights of at least about 1,000,000, more preferably at least about 4,000,000, and most preferably between about 5,000,000 and about 25,000,000.

Commercially available, suitable, retention aids include Reten 1232® and Microform 2321®, both emulsion polymerized cationic polyacrylamides and Reten 157®, which is delivered as a solid granule; all are products of Hercules, Inc. Other suitable products include Accurac 91 from Cytec Industries, Inc. 7520 from Nalco Chemical Co., or Bufloc 594 or Bufloc 606 from Buckman Laboratories, Inc.

Improvements in the areas of filler retention have been achieved using combinations of retention aids, for example a low-molecular-weight cationic polymer with a high molecular weight anionic polymer. Thus, according to the present invention, it is possible to use combinations of known retention aids, often called coagulants, retention aids or flocculants to achieve suitable retention of the ash and fines within the soft absorbent paper product according to the present invention.

The retention aid can be added at any suitable point in the approach flow of the furnish preparation system of the papermaking process. It is preferred that the retention aid be added after the fan pump and immediately prior to the furnish being delivered to the forming wire. It is preferred to add the retention aid after as much of the furnish processing involving shear, as is practical, has been completed.

The retention aid is preferably diluted to a consistency below about 0.5% solids and can be present in amounts as low at 0.005%, more preferably below about 0.35, still more preferably below about 0.1%, most preferably between about 0.05% and 0.2%. The retention aid is delivered to the process as a aqueous dispersion. Because of the relatively high molecular weight of most retention aids, the solids content of the dispersion should be kept as low as possible.

Whether the retention aid is of an anionic or cationic type, it will be delivered to the system as an aqueous emulsion, dispersion, or solution at comparable concentrations and overall usage rates.

The retention aid is incorporated into the furnish in an amount of from about 0.1 to about 4 lbs/ton, more preferably from about 0.3 to about 2 lbs/ton, most preferably about 0.5-1.5 lbs/ton.

It has been discovered that when using the above described chemistries, if one maximizes the amount of water flow through these high ash furnishes, i.e., minimizes the consistency of the furnish, the nascent web can be formed with better profiles and higher internal void volumes. The consistency of the furnish should be less than about 0.95, more preferably less than about 0.7% and most preferably, the furnish consistency should be less than about 0.5%. As used in the present application consistency includes total suspended solids present within the furnish. Consistency can be determined according to TAPPI method T240 OM-93, modified to use a medium filter paper, e.g., Whatman #3 to improve capture of all finely divided solids. The use of excess water is contrary to the common practice in the art when using high ash containing furnishes. Typically, when excess water is used with a high ash furnish, the fines and ash tend to be washed out of the web thereby leaving a thin and inconsistent formation profile. Excess water can overwhelm the former resulting not only in poor formation, but also in reduced production speed due to flooding.

Other chemicals can be added to the paper making slurry including, but not limited to, formation aids, drainage aids, defoamers, wet strength additives, pitch control agents, slimicides and biocides, creping agents, absorbency aids, dry strength additives and dyes. Appropriate agents will be readily understood by the skilled artisan.

After all chemicals are added to the furnish, it is delivered to the former where a nascent web is formed. Once the nascent web is formed, it can be dried using any technique known to the skilled artisan. Such drying techniques include compactive dewatering followed by drying on a Yankee dryer; through-air drying with or without drying on a Yankee dryer; wet creping from a Yankee dryer followed by can drying or TAD; and impulse drying with or without a Yankee dryer. The products according to the present invention are preferably made by conventional wet pressing and creping from a Yankee dryer.

In a preferred embodiment of the present invention, the product is a creped product. This means that the product, regardless of the initial drying method is adhered to and creped from a Yankee dryer. Preferred adhesives include polyvinyl alcohol with suitable plasticizers, glyoxylated polyacrylamide with or without polyvinyl alcohol, and polyamide epichlorohydrin resins such as Quacoat A-252 (QA252), Betzcreplus 97 (Betz+97) and Calgon 675 B. Other preferred adhesives include polyamine amide-epichlorohydrin resins such as Solvox 4450 and Houghton 82-213. Suitable adhesives are widely described in the patent literature. A comprehensive but non-exhaustive list includes U.S. Pat. Nos. 5,246,544; 4,304,625; 4,064,213; 3,926,716; 4,501,640; 4,528,316; 4,788,243; 4,883,564; 4,684,439; 5,326,434; 4,886,579; 5,374,334; 4,440,898; 5,382,323; 4,094,718; 5,025,046; and 5,281,307.

Typical release agents can be used in accordance with the present invention. Release agents appropriate for use with the present invention include Solvox 5309, Solvox Manufacturing. Typical release agents are complex mixtures of hydrocarbon oils and surfactants. Other release agents are Prosoft TR-8630 from Betz Dearborn; Houghton 565 and Houghton 8302, both from Houghton International; and R-253 from Quaker Chemical Corp.

Typical coating modifiers can be used in accordance with the present invention. Coating modifiers are typically polyvinyl alcohols, polyols, such as sorbitol, quaternized polyamide amines, or polyvinyl acetate latexes. Coating modifiers appropriate for use with the present invention include polyamido amines such as Quaker 2008.

Creping of the paper from the Yankee dryer is carried out at a moisture content preferably below about 50%, more preferably below about 15%, and still more preferably below about 6%. The creping angle is preferably from about 65° to about 90°. The creping angle is preferably between about 70° and about 85°, more preferably between about 75° and about 80°.

In a more preferred embodiment, creping of the paper from the Yankee dryer is carried out using an undulatory creping blade, such as that disclosed in U.S. Pat. No. 5,690,788, which is herein incorporated by reference.

A particularly important aspect of the manufacture of absorbent towel and tissue products in accordance with the present invention is the selection of a suitable debonder composition which can impart sufficient softness to a product made with recycled fiber. This feature is characterized by a reduction in dry breaking length (tensile) of absorbent sheet material, and is reported herein as a change, in percent, of tensile values from the value obtained from control example 1. This percent reduction in tensile is reported as a positive number and percent tensile change is reported as a negative number in FIGS. 2-8.

EXAMPLES

These formulations were prepared to demonstrate the ability of debonder compositions incorporating both ionic surfactants class mixed with nonionic surfactants to reduce the dry breaking length of absorbent sheet material prepared with recycled furnish.

Example 1

An absorbent sheet material was formed as British handsheets as follows:
100% recycle furnish was dispersed in water at 3% consistency, treated successively with 4.0#/T of Bufloc® 534 and 0.5#/T Bufloc® 594, and made into 51 g/m² British handsheets. These constitute the control sheets having an average dry breaking length of 2.6±0.3 km.

Example Series A

Example 1 was repeated except with from 3 to 8 #/T of a formulation (A) containing in part, 75 wt. % of a mixture of 1-(2-octadecenamidoethyl)-2-heptadecenyl-3-methylimidazolinium methylsulfate, 1-(2-octadecenamidoethyl)-2-heptadecenylimidazoline and 10 wt. % PEG-6-dioleate was added between additions of Bufloc 534 and Bufloc 594. The add-on of the Bufloc 534 was changed for each add-on level of surfactant to keep the final furnish charge neutral. This series of sheet is designated as "A" on FIG. 2.

Example Series B

The procedure of Example Series A was followed except that the debonder formulation included 1.9:1 di-(2-hydroxyethyl methyloctadecylammonium chloride:dimethyl-ditallowammonium chloride, formulated with 33 wt. % PEG-6-dilaurate. This series of sheet is designated as "B" on FIG. 2.

Example Series C

The procedure of Examples Series B was followed except that the debonder composition was dimethyl-ditallowammonium chloride. This series of sheet is designated as "C" on FIG. 2.

Example Series D

The procedure of Example Series C was followed except that behenyl-trimethylammonium chloride was used as the debonder. This series of sheet is designated as "D" on FIG. 2.

Example Series E

The procedure of Example Series D was followed except that the 2-ethanoic acid-dimethyl-dodecylamidopropylammonium methylsulfate was used as the debonder. This series of sheet is designated as "E" on FIG. 2.

Examples Series F

The procedure of Example Series E was followed except that di-(2-hydroxylethyl)methyloctadecylammonium chloride was used as the debonder. This series of examples of designated as "F" on FIG. 2.

Example Series G

The procedure of Example Series F was followed except that 2-hydroxyethyl-di-(2-tallowamidoethyl) methylammonium methylsulfate was used as the debonder. This series of examples is designated as "G" on FIG. 2.

Example Series H

The procedure of Example Series G was followed except that 1.9:1 di-(2-hydroxyethyl)-methyloctadecylammonium methylsulfate:dimethylditallow-ammonium chloride was used as the debonder composition. This series of examples is designated as "H" on FIG. 2.

Example Series I

The procedure of Example Series H was followed except a mixture of 1-(2-octadecenamidoethyl)-2-heptadecenyl-3-methylimidazolinium methylsulfate and 1-(2-octadecenamidoethyl)-2-heptadecenylimidazoline formulated with 54 wt. % PEG-200-dilaurate was used as the debonder. This series of examples is designated as "I" on FIG. 2.

Example Series J

The procedure of Example Series I was followed except that 1.5:1 di-(2-hydroxyethyl)-methyloctadecylammonium chloride:behenyl-trimethylammonium chloride was used as the debonder. This series of examples is designated as "J" on FIG. 2.

Figure 2:
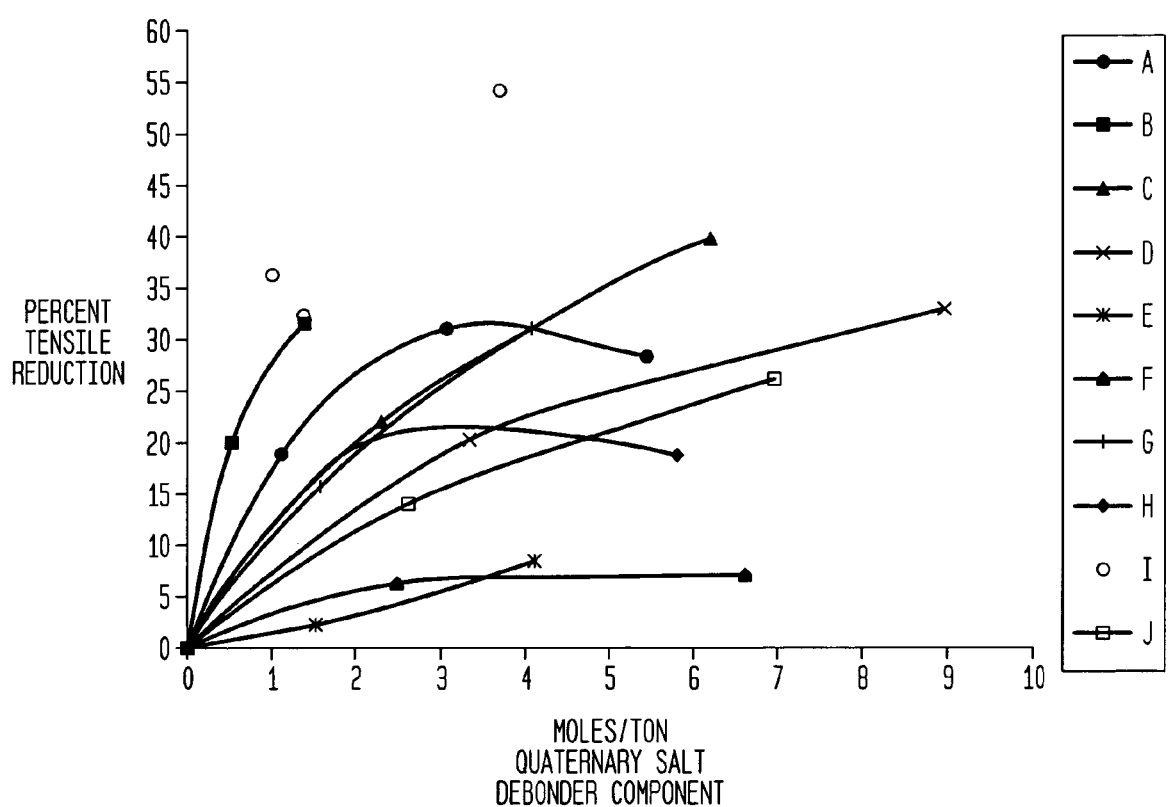
FIG. 2 is a plot of the percentage reduction in dry breaking length (tensile) vs. moles quaternary debonding component employed per ton of paper.

There is shown in FIG. 2 a plot of percent dry breaking length (tensile) reduction versus moles of quaternary ammonium compounds ("Add-on Chemistry") in the foregoing formulations per ton of paper. On this basis the ability of the various formulations to reduce breaking length can be compared on a purely structural basis. That is to say, the Add-on chemistry is expressed as moles of quaternary ammonium surfactant compounds in a given formulation per ton of paper. This allows one to compare chemistry performance on a purely structural basis. The average dry breaking length for the control, based on six replicates, was 2.6±0.3 km. A 4.4 as received #/ton treatment with formulation I was repeated three times to confirm results.

Generally speaking, it was found that:

- The ability to debond increases generally with the number of fatty chains in the molecules; that is, one chain is usually less effective than 2 chains per molecule;
- The longer the fatty chain molecule, the better as, the debonding order was observed for single chain quat: the behenyl (22 quat (D)) was greater than the C18 quat (F) which was greater than or equal to the C-12 quat (E);
- The quat C and G, debonded equally well but slightly less effectively than the imidazolinium quat A. All of these quats have double chains;
- Formulation B debonded much better than expected for the quat types it contains (See Table 1 below). This is due to synergy between the quats and the PEG-6-dilaurate in the formulation;
- The Formulation H which duplicates the mixture of the two quat types found in B without the other ingredients debonds in a manner that its additive level of the two quats. (See Table 1). Similarly formulation J which uses the bihenyl quat in place of the dialkyldimethylammonium quat in B, also debonded in an additive manner;
- Formulation I, which utilizes the synergy between the imidazolinium quat and the PEG-6-dilaurate debonded as well as B, but at least 50% better than A.

TABLE 1

Tensile reduction data for debonder/softener formulations.

| Formulation | Quat 1[A] (mol/ton) | Tensile Reduction (%) | Quat 2[B] (mol/ton) | Tensile Reduction (%) | Additive Tens. Red. (%) | Observed Tens. Red. (%) |
|---|---|---|---|---|---|---|
| H | 0.73 | 7 | 1.45 | 4 | 11 | 20 |
|   | 1.95 | 18 | 3.86 | 6 | 24 | 19 |
| J | 1.11[C] | 7 | 1.68 | 4 | 11 | 14 |
|   | 2.97[C] | 18 | 4.47 | 6 | 24 | 26 |
| B[D] | 0.19 | 2 | 0.37 | 2 | 4 | 20 |
|   | 0.51 | 5 | 0.98 | 3 | 8 | 32 |

[A]Dimethylditallowammonium chloride
[B]Di-(2-hydroxyethyl) - methylstearylammonium chloride
[C]Behenyl-trimethylammonium chloride instead of Quat 1
[D]Formulated with 33 wt. % PEG-6-dilaurate The discussion which follows compares four debonder formulations that were employed having the composition set forth in Table 2.

TABLE 2

Compositions of Debonder/Softeners as Weight Percent

| Debonder Composition | Im+ | Im | PG | PEG-6-dL | PEG-6-dO | LO | H₂O | PEG-6-td-ol | MeOleate |
|---|---|---|---|---|---|---|---|---|---|
| K | 56 | 20 | 8 | 0 | 8 | 0 | 0 | 10 | 0 |
| L | 28 | 10 | 4 | 50 | 4 | 0 | 0 | 5 | 0 |
| M | 42 | 7 | 9 | 18 | 0 | 7 | 16 | 0 | 1 |
| N | 76 | 13 | 9 | 0 | 0 | 0 | 0 | 0 | 2 |

Figure 3:
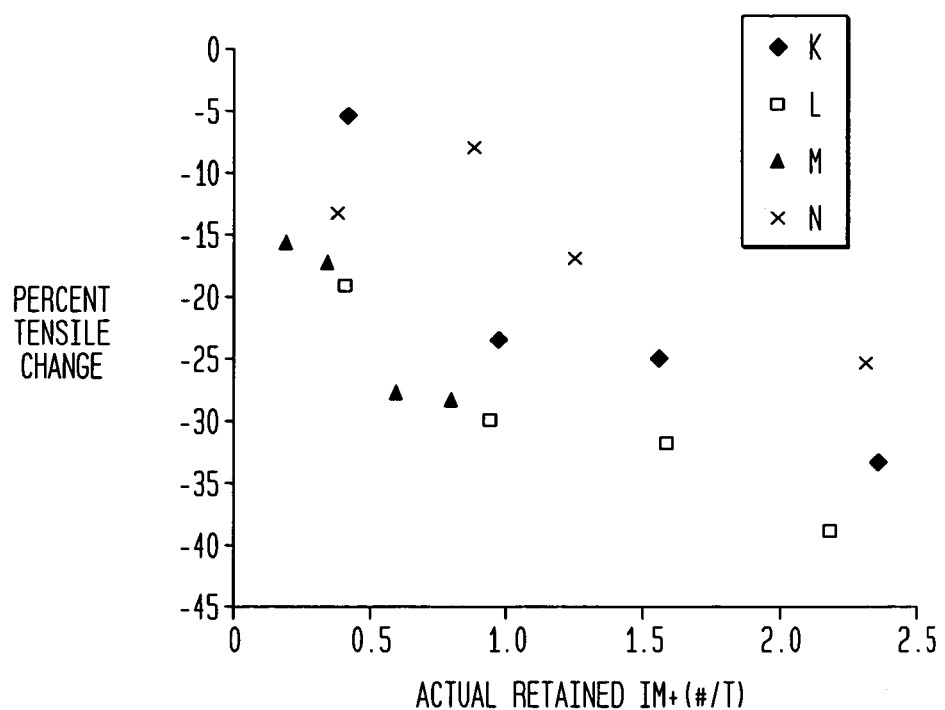
FIG. 3 is a plot of percent change in dry breaking length versus retained imidazolinium salt (pounds per ton)

Im+ = 1-(2-octadecenamidoethyl)-2-heptadecenyl-3-methylimidazolinium methylsulfate
Im = 1-(2-octadecenamidoethyl)-2-heptadecenylimidazoline
PG = propylene glycol
PEG-6-dL = PEG-6-dilaurate
PEG-6-dO = PEG-6-dioleate
LO = lauramine oxide
PEG-6-td-ol = PEG-6-tridecane-2-ol
MeOleate = methyl oleate Since the Imidazolinium ion (Im+) affects the wet end charge demand and imparts softness to the tissue, it is useful to compare the debonding abilities of the formulations in retained Im+, as in FIG. 3 which is a plot of percent change in dry breaking length vs. actual retained Im+. According to the data in FIG. 3 the order of debonding ability is L=M>K>N.

Figure 4:
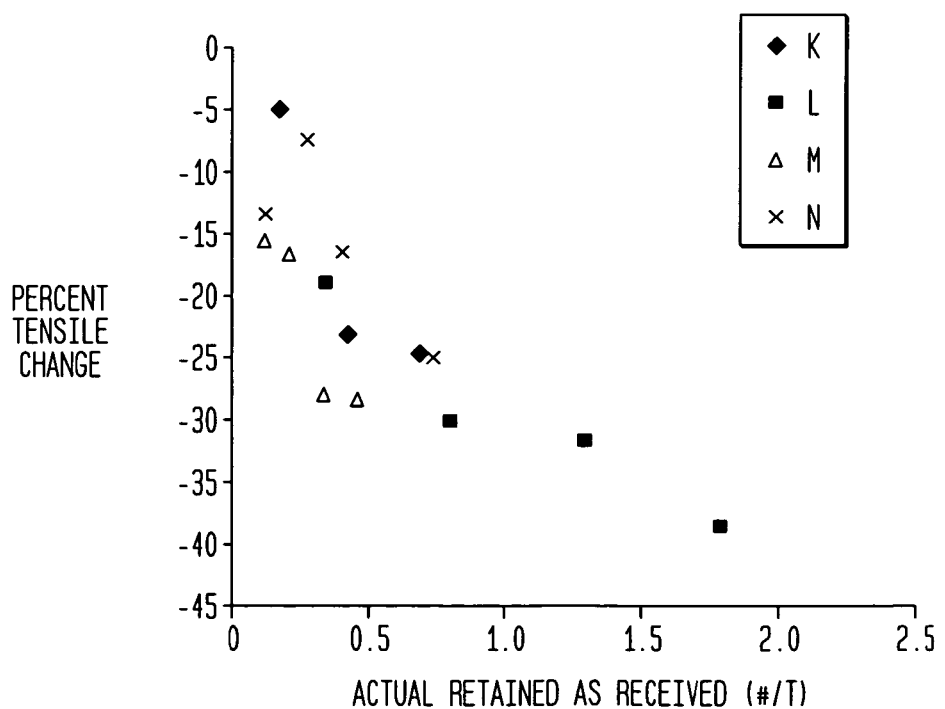
FIG. 4 is a plot of percentage change in dry breaking length vs. actual retained as received debonder composition in pounds per ton.

In practice, the user will be concerned with the as-received add-on and not pure Im+. The actual retained as-received formulation is shown in FIG. 4. We see that, except for possibly formulation M, all the formulations fall on the same curve. Since the PEG-200-diester provides equal debonding at less quat add-on, one can attain more debonding with higher doses of formulation L without impacting furnish charge demand; that is, formulation L allows us to move further down the curve. Similarly because formulation K contains some PEG-200-diester, it allows one to move further down the curve than possible with pure imidazolinium (i.e., formulation N). It is unclear whether formulation M actually falls on a new curve below the main curve. If so, greater debonding is expected with M than the other formulations at equal dosages.

While lauramine oxide is effective at increasing fiber debonding, it nevertheless competes with the imidazolinium quat for sites on the fibers. This is disadvantageous as lauramine oxide is not as an effective softener as the imidazolinium quat.

Surprisingly, it has been found the ability of the synergistic quaternary ammonium/nonionic surfactant debonding compositions to reduce tensile correlates with the hydrophilic lypophilic balance (HLB) of the nonionic surfactant employed in connection with the process.

For PEG monoesters of fatty acids having carbon chain lengths of 12 or more, an HLB value of more than about 10 is preferred. For PEG diesters the preferred HLB value depends on the carbon chain length of the fatty acid; thus, for short chains (C12) an HLB value of less than about 10 is desirable; whereas for longer chain fatty acids (C18) an HLB value greater than about 10 is preferred. One may conveniently use a C16 chain length as an approximate value to characterize this phenomenon.

Thus, the present invention is advantageously practiced in one preferred aspect in connection with nonionic diester or diether surfactants including alkoxylated fatty acids or fatty alcohols having a HLB value of greater than about 10 wherein the lypophilic alcohol or acid has at least about 16 carbon atoms or more. HLB values of from about 10 to 16 are typical as are lypophilic components with from about 16 to about 22 carbon atoms in these preferred embodiments. Typical nonionic surfactants advantageously utilized are PEG diesters and PEG diethers of fatty acids and fatty alcohols having carbon chain lengths greater than about C16.

So also, the invention is practiced in another preferred aspect in connection with PEG monoester or monoether nonionic surfactants having an HLB value of greater than about 10 and a single alkoxylated lypophilic fatty acid or fatty alcohol component. Typical compounds in these preferred embodiments include PEG monoester or monoethers of fatty acids or fatty alcohols having chain lengths greater than about C12.

The foregoing is summarized below in Table 3 for polyethylene glycol (PEG) monoesters and diesters of fatty acids.

TABLE 3

HLB for Maximum Debonding

| No. Carbon Atoms in Fatty Acid | Preferred HLB for PEG-Mono R | Preferred HLB for PEG-di-R |
|---|---|---|
| R = C12 | >10 | <10 |
| R = C18 | >10 | >10 |

A series of compositions were prepared and tested as follows:

Handsheets were prepared as with composition L above, except that the composition was modified by replacing the PEG-6-dilaurate with a given PEG diester or PEG monoester variant.

Figure 5:
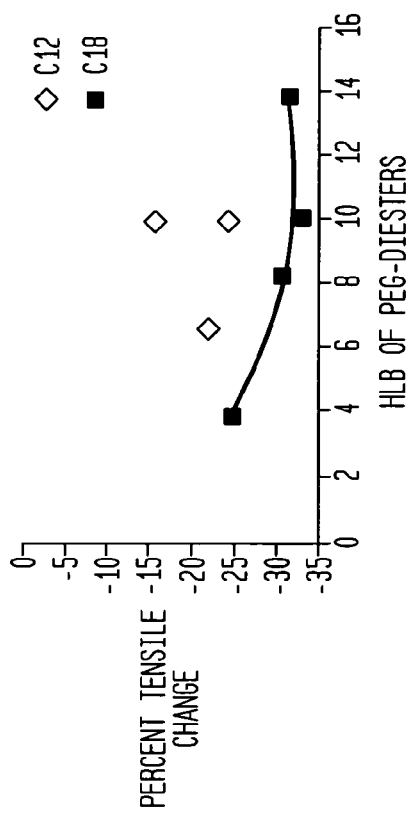
FIG. 5 is a plot of percent tensile change vs. HLB for various PEG mono or diesters of C12 or C18 fatty acids.
Figure 6:
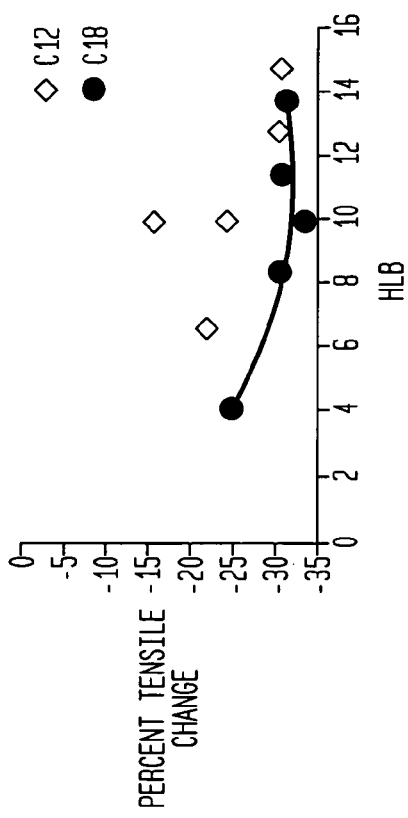
FIG. 6 is a plot of percent tensile change vs. HLB for certain PEG-diesters of C12 and C18 fatty acids.
Figure 7:
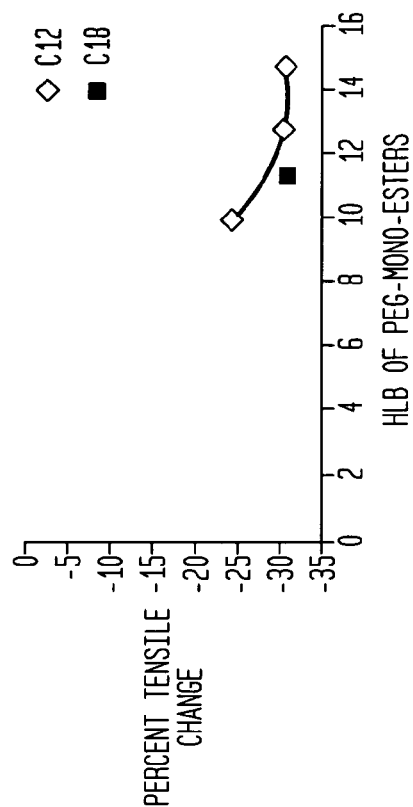
FIG. 7 is a plot of percent tensile change vs. PEG chain length for certain PEG mono and diesters of C12 and C18 fatty acids.
Figure 8:
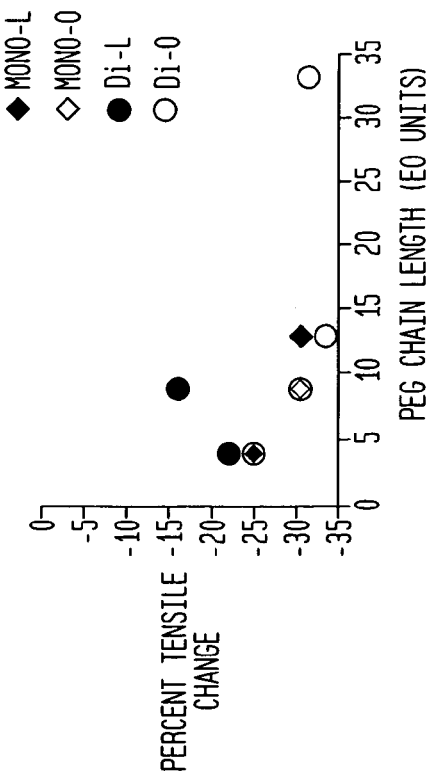
FIG. 8 is a plot of percent tensile change vs. HLB for certain PEG-monoesters of C12 and C18 fatty acids.

Results are summarized in FIGS. 5 though 8.

Utilizing the above learnings the following formulations each provided an additional 20% dry tensile reduction over that achieved with Formula L (Table 2) at equal add-ons of 6 as-received lbs/ton:

Formula O: 38 wt % mixture of 1-(2-octadecenamidoethyl)-2-heptadecenyl-3-methylimidazolinium methylsulfate and 1-(2-octadecenamidoethyl)-2-heptadecenylimidazoline, 50 wt % PEG-600-dioleate, 7.3 wt % PEG-400-monolaurate, 3.8 wt % propylene glycol, and 0.8 wt % methyloleate.

Formula P: 44.5 wt % mixture of 1-(2-octadecenamidoethyl)-2-heptadecenyl-3-methylimidazolinium methylsulfate and 1-(2-octadecenamidoethyl)-2-heptadecenylimidazoline, 50 wt % PEG-400-monooleate, 4.5 wt % propylene glycol and 0.8 wt % methyloleate.

What is claimed is:

1. A method for forming a soft absorbent tissue product comprising:

supplying a furnish comprising predominately recycle cellulosic fibers in an aqueous stream;

adding a charge modifier to said furnish wherein said charge modifier contacts said furnish for a time sufficient to reduce the charge in the furnish;

adding a debonder composition comprising a synergistic combination of a quaternary ammonium surfactant component and nonionic surfactant component and optionally adding a wet-strength-adjusting agent to said furnish, after said charge has been reduced;

adding a retention aid to said furnish after said debonder or wet strength adjusting agent has been in contact with said furnish for a time sufficient to allow distribution of said debonder or wet strength adjusting agent on said fibers;

supplying said furnish to a headbox, and wherein said furnish has a consistency of not greater than 0.90% as supplied to the headbox;

applying said furnish to a forming wire and forming a nascent web; and drying said web to form a paper product.

* * * * *